ус011639183в2

United States Patent
Tsuda

(10) Patent No.: US 11,639,183 B2
(45) Date of Patent: May 2, 2023

(54) DRIVING CONTROL DEVICE, DRIVING CONTROL METHOD, AND COMPUTER READABLE MEDIUM

(71) Applicant: Mitsubishi Electric Corporation, Chiyoda-ku (JP)

(72) Inventor: Yoshiaki Tsuda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 135 days.

(21) Appl. No.: 16/770,977

(22) PCT Filed: Jan. 17, 2018

(86) PCT No.: PCT/JP2018/001255
§ 371 (c)(1),
(2) Date: Jun. 9, 2020

(87) PCT Pub. No.: WO2019/142276
PCT Pub. Date: Jul. 25, 2019

(65) Prior Publication Data
US 2020/0385015 A1 Dec. 10, 2020

(51) Int. Cl.
*B60W 60/00* (2020.01)
*B60W 30/182* (2020.01)
(52) U.S. Cl.
CPC ........ *B60W 60/001* (2020.02); *B60W 30/182* (2013.01)
(58) Field of Classification Search
CPC combination set(s) only.
See application file for complete search history.

(56) References Cited

U.S. PATENT DOCUMENTS

2006/0190158 A1* 8/2006 Shiiba ............... B60K 31/0066
701/70
2007/0050127 A1* 3/2007 Kellum ............. G01C 21/3697
340/995.27

(Continued)

FOREIGN PATENT DOCUMENTS

CN 105584486 A 5/2016
JP 7-306998 A 11/1995

(Continued)

OTHER PUBLICATIONS

International Search Report dated Apr. 10, 2018 in PCT/JP2018/001255 filed Jan. 17, 2018.

(Continued)

*Primary Examiner* — Nicholas Kiswanto
*Assistant Examiner* — Madison B Emmett
(74) *Attorney, Agent, or Firm* — Oblon, McClelland, Maier & Neustadt, L.L.P.

(57) ABSTRACT

A mode acquisition unit (21) accepts designation of a driver type from a driver or a passenger, among driver types provided by driver's driving skill. A mode acquisition unit (21) acquires a driving mode corresponding to a designated type which is a designated driver type. The driving mode indicates a control method of automated driving corresponding to a driving skill. The driving control unit (22) causes a mobile body (100) to perform automated driving in accordance with the control method indicated by the driving mode acquired by the mode acquisition unit (21), thereby realizing automated driving corresponding to the driving skill.

8 Claims, 10 Drawing Sheets

(56) References Cited

U.S. PATENT DOCUMENTS

| | | | | |
|---|---|---|---|---|
| 2010/0209888 A1* | 8/2010 | Huang | G09B 19/167 | 434/66 |
| 2012/0310499 A1* | 12/2012 | Kiefer | F16H 61/0213 | 701/65 |
| 2017/0032673 A1* | 2/2017 | Scofield | A61B 5/4845 | |
| 2018/0113460 A1 | 4/2018 | Koda et al. | | |
| 2018/0127001 A1* | 5/2018 | Ricci | B60W 50/14 | |
| 2018/0170392 A1* | 6/2018 | Yang | B60W 50/14 | |
| 2018/0194365 A1* | 7/2018 | Bae | B60W 10/18 | |
| 2018/0208206 A1* | 7/2018 | Petrucci | B62D 15/021 | |
| 2019/0071101 A1 | 3/2019 | Emura et al. | | |
| 2019/0106120 A1 | 4/2019 | Hatano et al. | | |
| 2019/0113353 A1* | 4/2019 | Shimizu | G05D 1/0088 | |

FOREIGN PATENT DOCUMENTS

| | | |
|---|---|---|
| JP | 2007-133486 A | 5/2007 |
| JP | 2010-83402 A | 4/2010 |
| JP | 2015-89801 A | 5/2015 |
| JP | 2016-18238 A | 2/2016 |
| JP | 2016-215658 A | 12/2016 |
| JP | 2017-182278 A | 10/2017 |
| JP | 2017-220096 A | 12/2017 |
| JP | 2017-227445 A | 12/2017 |
| WO | WO 2016/052507 A1 | 4/2016 |
| WO | WO 2016/152873 A1 | 9/2016 |
| WO | WO 2017/163667 A1 | 9/2017 |
| WO | WO 2017/179151 A1 | 10/2017 |

OTHER PUBLICATIONS

Combined Chinese Office Action and Search Report dated Oct. 25, 2022 in Chinese Patent Application No. 201880085953.9 (with unedited computer generated English Translation of Office Action only), 16 pages.

* cited by examiner

| DRIVER TYPE | DRIVING MODE |
|---|---|
| HIGH SKILL | HIGH-SKILL MODE |
| MEDIUM SKILL | MEDIUM-SKILL MODE |
| NOVICE | NOVICE MODE |

DRIVING CONTROL DEVICE, DRIVING CONTROL METHOD, AND COMPUTER READABLE MEDIUM

TECHNICAL FIELD

The present invention relates to an automated driving technique of a mobile body such as a vehicle.

BACKGROUND ART

Studies have been made on an automated driving technique (see Patent Literature 1).

An automated driving vehicle recognizes an obstacle and a mobile object by detecting a periphery of the vehicle with various kinds of sensors mounted on the vehicle, and travels by operating a steering wheel and so on to avoid the obstacle and the mobile object.

Specifically, in the automated driving vehicle, many sensors such as a camera, a laser, and a radar are mounted on the vehicle. The automated driving vehicle detects the periphery of the vehicle by the sensors that are independent of each other, or by a combination of the plurality of sensors, and discriminates presence/absence of an obstacle such as another vehicle, a person, and a structure existing around the vehicle, taking the vehicle as the center. Also, the automated driving vehicle recognizes a traveling position of the vehicle by matching a vehicle speed pulse and traveling speed of the vehicle, a Global Positioning System (GPS) signal, and three-dimensional map data. The automated driving vehicle also specifies a future position of the vehicle from the present position, the vehicle speed, and the vehicle speed pulse. Then, the automated driving vehicle performs automated driving in accordance with a computer judgment while considering presence/absence of an obstacle and the present and future positions of the vehicle.

CITATION LIST

Patent Literature

Patent Literature 1: International Publication WO2017/179151

SUMMARY OF INVENTION

Technical Problem

An automated driving vehicle travels in accordance with a computer judgment. A driver and a passenger sitting on board the automated driving vehicle may feel odd or scared for vehicle's behavior when the behavior is different from behavior of manned driving conducted by a driver.

To cope with circumstances surrounding the vehicle such as rain, snow, and fog, a driver drives by adjusting the vehicle speed. Since the automated driving vehicle travels according to a condition designated by a vehicle designer, the driver and the passenger may feel odd and scared.

An objective of the present invention is to reduce the odd feeling and scare the driver and the passenger may have due to automated driving.

Solution to Problem

A driving control device according to the present invention includes:

a mode acquisition unit to acquire a driving mode corresponding to a designated type which is a designated driver type among driver types provided by driving skill; and a driving control unit to cause a mobile body to perform automated driving in accordance with a control method indicated by the driving mode acquired by the mode acquisition unit.

Advantageous Effects of Invention

In the present invention, a mobile body performs automated driving in accordance with a control method indicated by a driving mode corresponding to a designated type among driver types provided by driving skill. Hence, automated driving is performed by a control method corresponding to a driving skill of a driver or the like. Therefore, an odd feeling and scare the driver and the passenger may have due to automated driving can be reduced.

BRIEF DESCRIPTION OF DRAWINGS

FIG. 3 is a diagram illustrating a mode storage unit 31 according to Embodiment 1.

DESCRIPTION OF EMBODIMENTS

Embodiment 1

* Description of Configuration *

Figure 1:
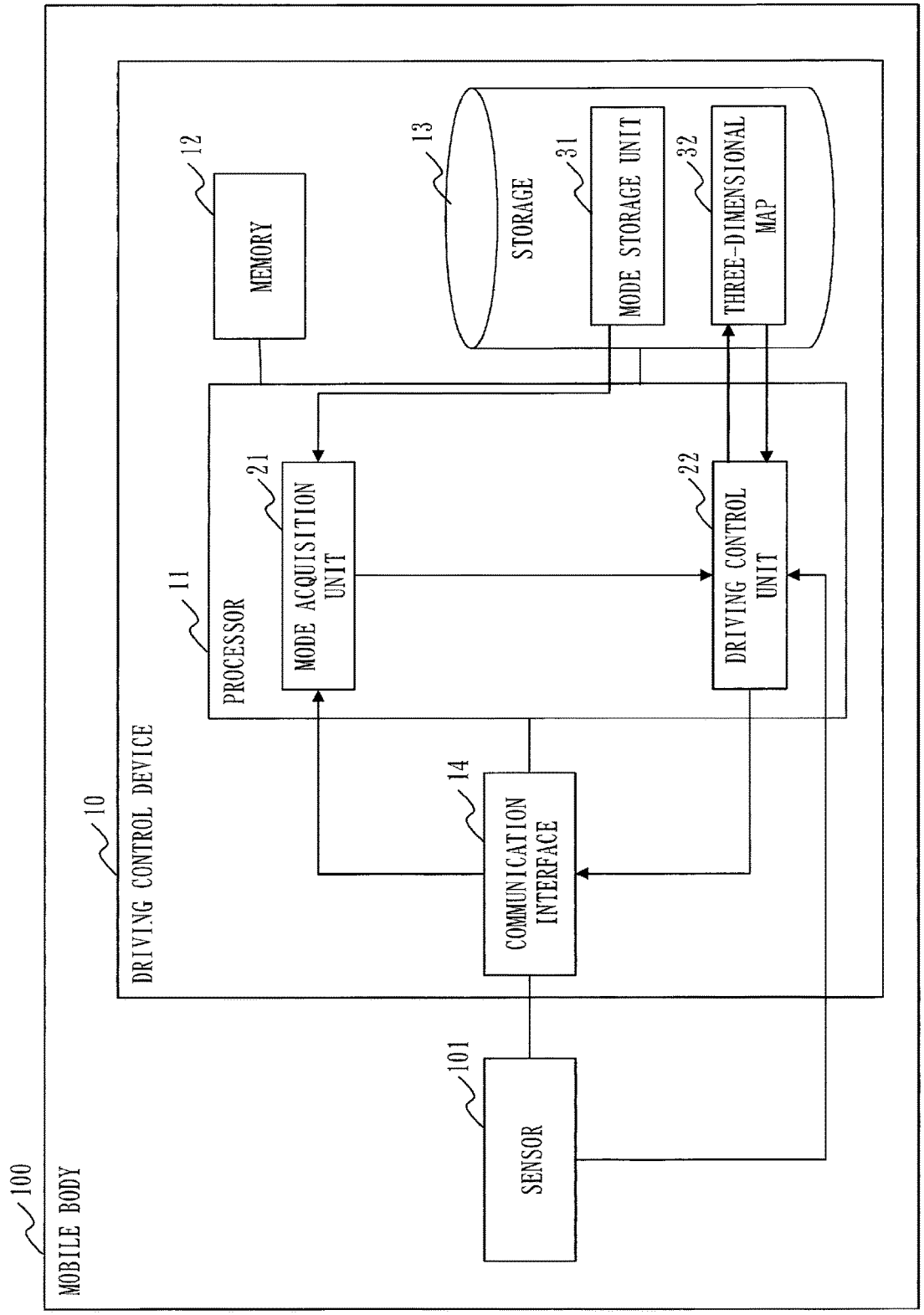
FIG. 1 is a configuration diagram of a driving control device 10 according to Embodiment 1.

A configuration of a driving control device 10 according to Embodiment 1 will be described with referring to FIG. 1.

The driving control device 10 is a computer mounted on a mobile body 100. Assume that in Embodiment 1, the mobile body 100 is a vehicle. The mobile body 100 may be another type of passenger vehicle such as a ship and an aircraft.

The driving control device 10 may be inseparably integrated with the mobile body 100, or may be separable from the mobile body 100.

The driving control device 10 is provided with hardware devices which are a processor 11, a memory 12, a storage 13, and a communication interface 14. The processor 11 is connected to the other hardware devices via signal lines and controls these other hardware devices.

The processor 11 is an Integrated Circuit (IC) which performs processing. Specific examples of the processor 11 include a Central Processing Unit (CPU), a Digital Signal Processor (DSP), and a Graphics Processing Unit (GPU).

The memory 12 is a storage device which stores data temporarily. Specific examples of the memory 12 include a Static Random Access Memory (SRAM) and a Dynamic Random Access Memory (DRAM).

The storage 13 is a storage device which keeps data. Specific examples of the storage 13 include a Hard Disk Drive (HDD). The storage 13 may be a portable recording medium such as an SD (registered trademark for Secure Digital) memory card, a CompactFlash (registered trademark; CF), a NAND flash, a flexible disk, an optical disk, a compact disk, a blu-ray (registered trademark) disk, and a Digital Versatile Disk (DVD).

The communication interface 14 is an interface to communicate with an external device. Specific examples of the communication interface 14 include an Ethernet (registered trademark) port, a Universal Serial Bus (USB) port, and an HDMI (registered trademark for High-Definition Multimedia Interface) port.

The driving control device 10 is connected to a sensor 101 mounted on the mobile body 100, via the communication interface 14.

The sensor 101 includes a millimeter wave radar, a LiDAR, a camera, a position location device, and so on. Based on a positioning signal from a Global Navigation Satellite System (GNSS) satellite such as a GPS satellite and a quasi-zenith satellite, the position location device corrects an error involved in the positioning signal by positioning reinforcement information obtained from the quasi-zenith satellite or mobile data communication, to measure three-dimensional self-position information with high precision of 50 cm or less. The position location device may reduce a positioning error of a self-position precision by Inertial Navigation System (INS)-combined processing in which observation information of GNSS satellite positioning is tightly coupled with observation information of a gyro, an acceleration sensor, a vehicle speed pulse, or the like.

The driving control device 10 is provided with a mode acquisition unit 21 and a driving control unit 22, as function-constituent elements. Functions of the function-constituent elements of the driving control device 10 are implemented by software.

A program that implements the functions of the function-constituent elements of the driving control device 10, and data for use in driving control are stored in the storage 13. This program is read into the memory 12 by the processor 11 and executed by the processor 11. Hence, the functions of the function-constituent elements of the driving control device 10 are implemented.

Also, the storage 13 implements a function of a mode storage unit 31.

Data of three-dimensional map 32 with high precision of 50 cm or less is stored in the storage 13.

The three-dimensional map 32 stores dynamic map data (DMD) which is map data for use in automated driving of an automated driving car 200. DMD consists of static information, quasi-static information, quasi-dynamic information, and dynamic information. The static information of the DMD is three-dimensional platform map data. The static information of the DMD is constituted of road-surface information, lane information, and three-dimensional position coordinates and straight vector data which indicate a feature including a three-dimensional structure and so on. The quasi-static information, the quasi-dynamic information, and the dynamic information are dynamic data that change constantly. The quasi-static information, the quasi-dynamic information, and the dynamic information are data that are superposed on the static information on the basis of a position reference platform. The quasi-static information includes traffic rules information, road construction information, wide-area weather information, and so on. The quasi-dynamic information includes traffic accident information, traffic jam information, narrow-area weather information, and so on. The dynamic information includes ITS information (information on a periphery of a vehicle, information on pedestrians, information on traffic lights, and so on).

Also, the three-dimensional (high-precision) map 32 may store additional information corresponding to the static information of the DMD.

In FIG. 1, only one processor 11 is illustrated. However, a plurality of processors 11 may be provided. The plurality of processors 11 may cooperate with each other to execute the program that implements the functions.

* Description of Operation *

An operation of the driving control device 10 according to Embodiment 1 will be described with referring to FIGS. 2 and 3.

The operation of the driving control device 10 according to Embodiment 1 corresponds to a driving control method according to Embodiment 1. The operation of the driving control device 10 according to Embodiment 1 also corresponds to a driving control program according to Embodiment 1.

Figure 2:
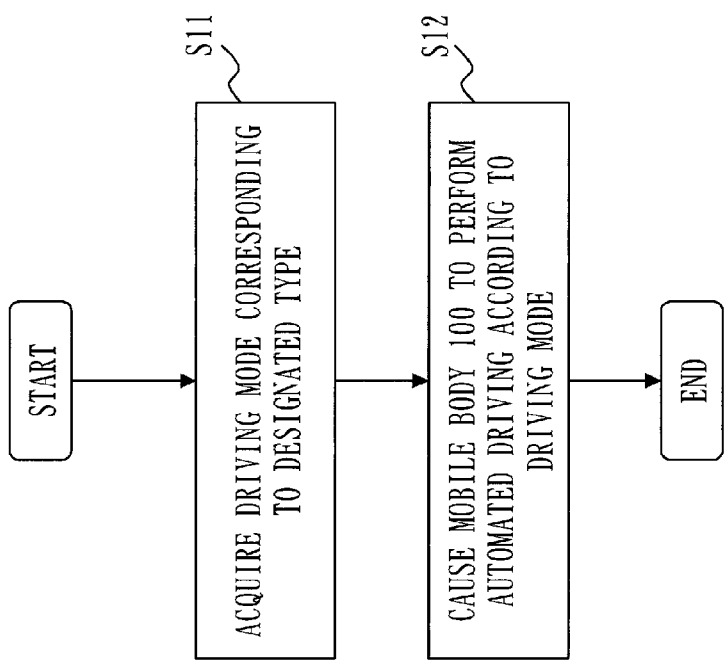
FIG. 2 is a flowchart illustrating an operation of the driving control device 10 according to Embodiment 1.

In Embodiment 1, processing illustrated in FIG. 2 is executed at the start of automated driving and so on.

(Step S11 of FIG. 2: Mode Acquisition Process)

The mode acquisition unit 21 acquires a driving mode corresponding to a designated type which is a designated driver type among driver types provided by driving skill.

Specifically, the mode acquisition unit 21 accepts a designated type inputted by an input device which is connected via the communication interface 14 and operated by a driver or the like. The mode acquisition unit 21 reads out the driving mode corresponding to the designated type from the mode storage unit 31. The mode acquisition unit 21 writes the readout driving mode to the memory 12.

As illustrated in FIG. 3, the mode storage unit 31 stores driving modes by driver type.

The driver types are provided by driving skill such as high skill, medium skill, and novice.

The driving mode expresses a control method of automated driving corresponding to the driving skill. In a specific example, the driving mode expresses a control method for a speed with respect to a speed limit, turning a curve, and so on. The speed with respect to a speed limit means how fast the vehicle will travel with respect to the speed limit. For example, the speed with respect to the speed limit indicates, if the driver type is high skill or medium skill, traveling at speed limit, and if the driver type is novice, traveling at a speed obtained by multiplying the speed limit by 0.8. Turning a curve signifies speed control, steering wheel control, and so on involved in turning a curve. For example, turning a curve indicates, if the driver type is high skill, starting to slow down the speed 10 m before the curve; if the driver type is medium skill, starting to slow down the speed 15 m before the curve; and if the driver type is novice, starting to slow down the speed 20 m before the curve.

The additional information of the three-dimensional map 32 may contain travel-controlling position information corresponding to the driver type of the driving mode.

For example, the travel-controlling position information contains position coordinate data, by driver type, of a point for an uphill slope road at which a slope angle reaches 0.5 degree or more, and position coordinate data, by driver type, of a point for a downhill slope road at which a downhill slope reaches 0.3 degree or more.

The travel-controlling position information contains position coordinate data, by driver type, indicating a position of a point to slow down the speed before a curve, and position coordinate data, by driver type, of travel trajectory (travel line) along the curve.

These points of the travel-controlling position information are set based on the three-dimensional coordinates of the static information of the dynamic map, and are given as, for example, X m in the lane direction (a direction along the lane) and Y m in the lane width direction (a direction perpendicular to the road lane) from a position reference.

(Step S12 of FIG. 2: Driving Control Process)

The driving control unit 22 causes the mobile body 100 to perform automated driving in accordance with the control method indicated by the driving mode acquired in step S11.

Specifically, the driving control unit 22 reads out the driving mode from the memory 12. Then, the driving control unit 22 causes the mobile body 100 to perform automated driving, using a position of an obstacle detected by the sensor, present and future positions of the mobile body 100 which are identified from a GPA signal or the like, and the map data, in accordance with the control method indicated by the driving mode, such that the mobile body 100 moves forward along the planned moving route while preventing collision against the obstacle. In short, the driving control unit 22 causes the mobile body 100 to perform automated driving by controlling apparatuses such as an accelerator, a brake, a steering wheel, and so on of the mobile body 100 via the communication interface 14.

On this occasion, the driving control unit 22 performs control such as adjusting a torque of a vehicle motor so that for an uphill slope road, acceleration starts at a point at which the slope angle reaches 0.5 degree or more, and for a downhill slope road, engine braking is applied at a point at which a downhill slope reaches 0.3 degree or more. Also, in the case of a curve, the driving control unit 22 performs control such as steering the steering wheel, starting at a point at which the road starts to bend by 0.3 degree or more with respect to a straight line, so that the mobile body 100 is on the inner side of the center of a lane where the mobile body 100 is traveling. Particularly, in addition to the control described above, the driving control unit 22 performs control in accordance with the control method indicated by the driving mode. For example, if the designated type is novice, the driving control unit 22 performs control so that, for example, the vehicle travels at a speed obtained by multiplying the speed limit by 0.8, and slows down the speed 20 m before the start of a curve whose start is a point at which the road starts to bend by 0.3 degree or more with respect to the straight line.

Also, the driving control unit 22 may control automated driving of the mobile body 100 by a travel control method that differs depending on the driver type, based on the correspondence relationship between the position information measured by the sensor 101 and the travel-controlling position information corresponding to the driver type of the driving mode in the additional information of the three-dimensional (high-precision) map 32.

For example, the driving control unit 22 obtains the present position from the measurement information of the sensor 101 and refers to the travel-controlling position information in the additional information of the three-dimensional map 32 corresponding to the present position. Then, in case of a curve, the driving control unit 22 performs control of applying brake at a point corresponding to the driver type, where the start of the curve is a point at which the road starts to bend by 0.3 degree from the straight line. When the road width is 6.5 m, if the driver type is high skill, the braking point is 10 m before the start of curve and 5 m outward of the road center line. If the driver type is medium skill, the braking point is 15 m before the start of the curve and 4 m outward of the road center line. If the driver type is novice, the braking point is 20 m before the start of the curve and 3 m outward of the road center line.

The driving control unit 22 compares the position information of the mobile body 100 obtained by the sensor 101 with the travel-controlling position information defined by the additional information of the three-dimensional map 32, and determines whether or not the position information of the mobile body 100 reaches the braking point defined by the additional information of the three-dimensional map 32. When it is determined that the braking point is reached, the driving control unit 22 activates automatic braking. At the braking point, if the driver type is high skill, the driving control unit 22 brakes rather strongly and performs an operation of rotating the steering wheel at a point at which the speed has reduced to a predetermined speed or less. If the driver type is medium skill, the driving control unit 22 brakes with a medium strength and performs an operation of rotating the steering wheel at a point at which the speed has reduced to the predetermined speed or less. If the driver type is novice, the driving control unit 22 brakes with a strength lower than the medium strength and performs an operation of rotating the steering wheel at a time point at which the speed has reduced to the predetermined speed or less.

Hence, automated driving control can be performed in an interlocked manner with the static information of the dynamic map, by a travel control method that differs depending on the driver type of the driving mode.

\*\*\* Effect of Embodiment 1 \*\*\*

As described above, the driving control device 10 according to Embodiment 1 causes the mobile body 100 to perform automated driving in accordance with the control method indicated by the driving mode corresponding to the designated type.

Hence, in principle, driving that is close to an operation by a well-experienced person is performed, and while comfortable driving is being realized, driving that is close to a driving skill of the driver and the passenger is realized, when necessary. Therefore, an odd feeling and scare the driver and the passenger may have due to automated driving can be reduced.

If a scare is given to the driver and the passenger, safety may be impaired. For example, the driver and the passenger, feeling scared against the centrifugal force being produced due to the curve, will move to the other side or the like in the vehicle. The center of gravity of the mobile body 100 moves accordingly, and a load is applied to the control over the mobile body 100.

\*\*\* Other Configurations \*\*\*

<Modification 1>

In Embodiment 1, the function-constituent elements are implemented by software. In Modification 1, the function-constituent elements may be implemented by hardware. Modification 1 will be described regarding its difference from Embodiment 1.

Figure 4:
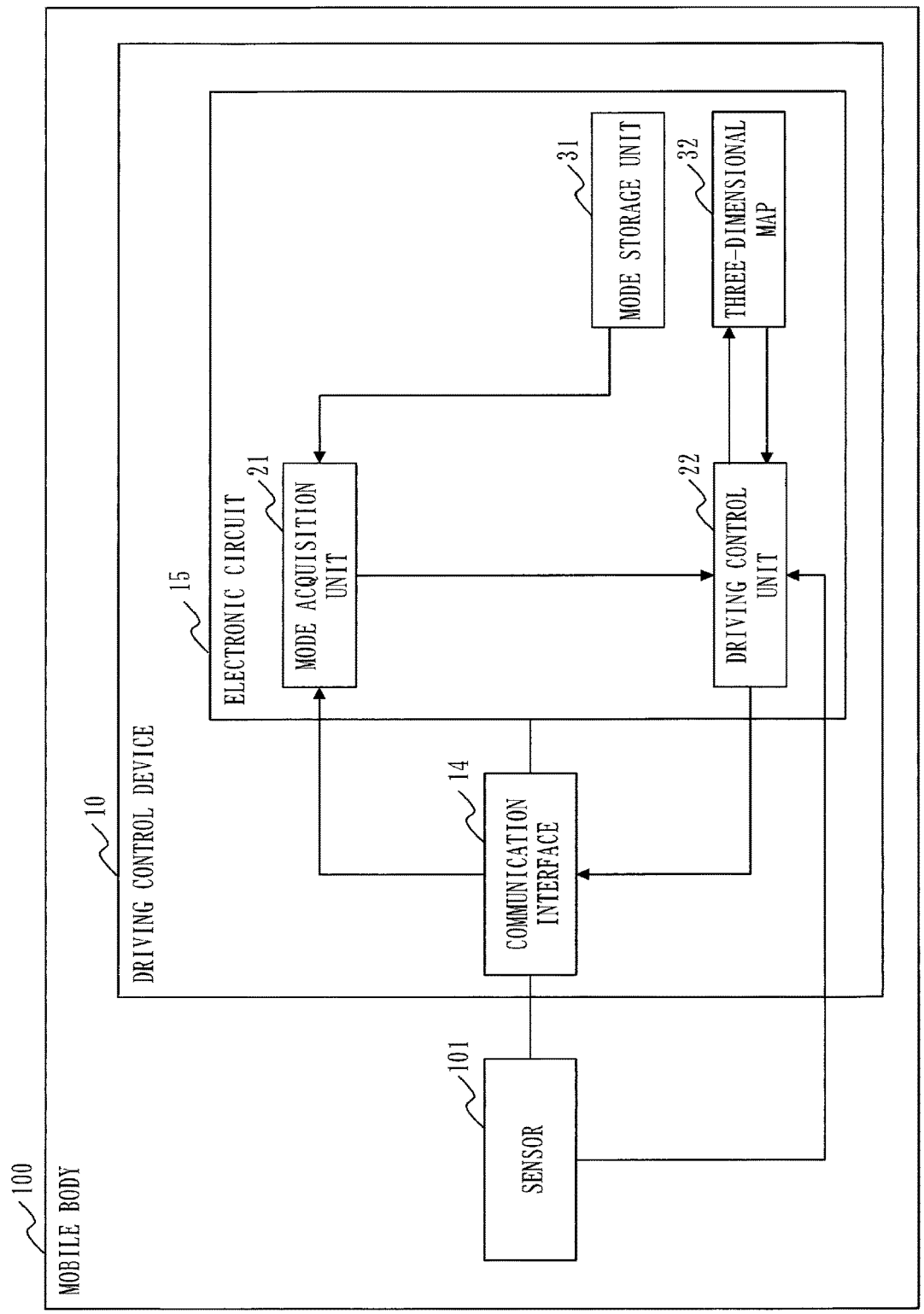
FIG. 4 is a configuration diagram of a driving control device 10 according to Modification 1.

A configuration of a driving control device 10 according to Modification 1 will be described with referring to FIG. 4.

When the function-constituent elements are implemented by hardware, the driving control device 10 is provided with an electronic circuit 15 in place of a processor 11, a memory 12, and a storage 13. The electronic circuit 15 is a dedicated circuit that implements functions of the function-constituent elements and functions of the memory 12 and storage 13.

The electronic circuit 15 is assumed to be a single circuit, a composite circuit, a programmed processor, a parallel-programmed processor, a logic IC, a Gate Array (GA), an Application Specific Integrated Circuit (ASIC), or a Field-Programmable Gate Array (FPGA).

The function-constituent elements may be implemented by one electronic circuit 15, or may be implemented by a plurality of electronic circuits 15 through distribution.

<Modification 2>

In a Modification 2, some function-constituent elements may be implemented by hardware and the remaining function-constituent elements may be implemented by software.

A processor 11, a memory 12, a storage 13, and an electronic circuit 15 are referred to as processing circuitry. That is, functions of the function-constituent elements are implemented by processing circuitry.

Embodiment 2

A driving mode is determined according to road information of a planned moving route which is a route along which a mobile body 100 will move. In this respect, Embodiment 2 is different from Embodiment 1. In Embodiment 2, this difference will be described, and description of a matter shared with Embodiment 1 will be omitted.

* Description of Operation *

Figure 5:
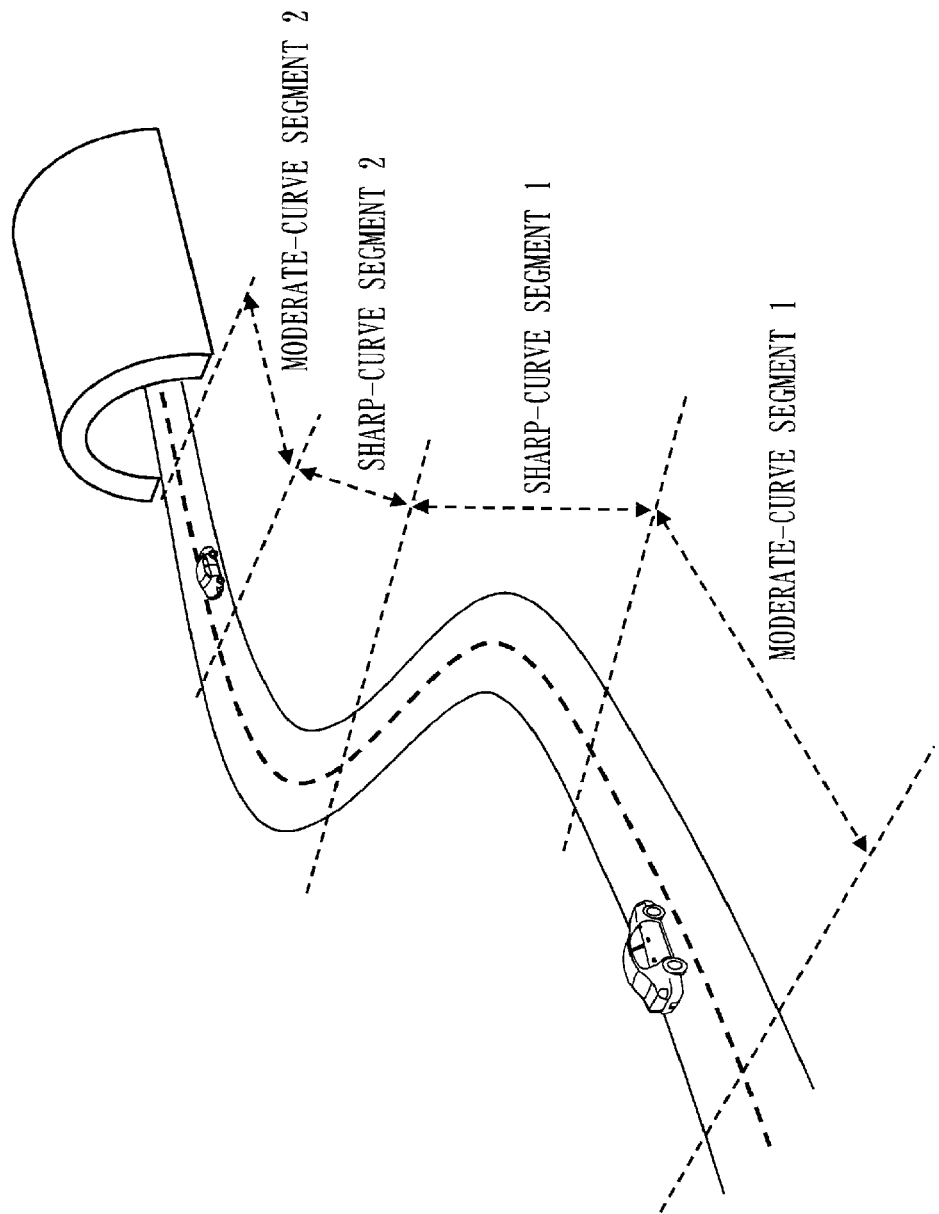
FIG. 5 is an explanatory diagram of an operation of a driving control device 10 according to Embodiment 2.

An operation of a driving control device 10 according to Embodiment 2 will be described with referring to FIGS. 2 and 5.

The operation of the driving control device 10 according to Embodiment 2 corresponds to a driving control method according to Embodiment 2. The operation of the driving control device 10 according to Embodiment 2 also corresponds to processing of a driving control program according to Embodiment 2.

In Embodiment 2, processing illustrated in FIG. 2 is executed periodically, or each time movement is made for a criterion distance.

(Step S11 of FIG. 2: Mode Acquisition Process)

A mode acquisition unit 21 acquires a driving mode corresponding to a designated type and to road information of a planned moving route of the mobile body 100.

Specifically, the mode acquisition unit 21 transmits the designated type and the planned moving route of the mobile body 100 to a load-side apparatus located on a periphery of the mobile body 100. Then, the road-side apparatus transmits a driving mode corresponding to the designated type and to the road information of the planned moving route of the mobile body 100, to the driving control device 10. Assume that the road-side apparatus holds road information on the road on a periphery of the road-side apparatus. The road information indicates, for example: a road surface status such as whether the road is dry, wet, or frozen; weather such as fine, rainy, and foggy; and a road status such as whether the roads is straight, forms a moderate curve, forms a sharp curve, and so on. The mode acquisition unit 21 acquires the driving mode transmitted from the road-side apparatus. The mode acquisition unit 21 writes the acquired driving mode to a memory 12.

The mode acquisition unit 21 may acquire the driving mode from another device such as a server outside the mobile body 100, in place of from the road-side apparatus.

Process of step S12 is the same as that of Embodiment 1.

Process illustrated in FIG. 2 is executed periodically, or each time movement is made for a criterion distance. Therefore, as illustrated in FIG. 5, there is a possibility that the driving mode is changed by segment being a division of the planned moving route, according to the road information of the segment. For example, in moderate-curve segments 1 and 2, automated driving is performed in a novice mode. In sharp-curve segments 1 and 2, automated driving is performed in a high-skill mode.

* Effect of Embodiment 2 *

As described above, the driving control device 10 according to Embodiment 2 determines the driving mode not only according to the designated type but also according to the road information of the planned movement route of the mobile body 100. As a result, a more appropriate driving mode is selected, so that high-safety automated driving can be realized.

* Other Configurations *

<Modification 3>

In Embodiment 2, the road-side apparatus determines the driving mode. However, the driving control device 10 may acquire road information, and the driving control device 10 may determine the driving mode.

Figure 6:
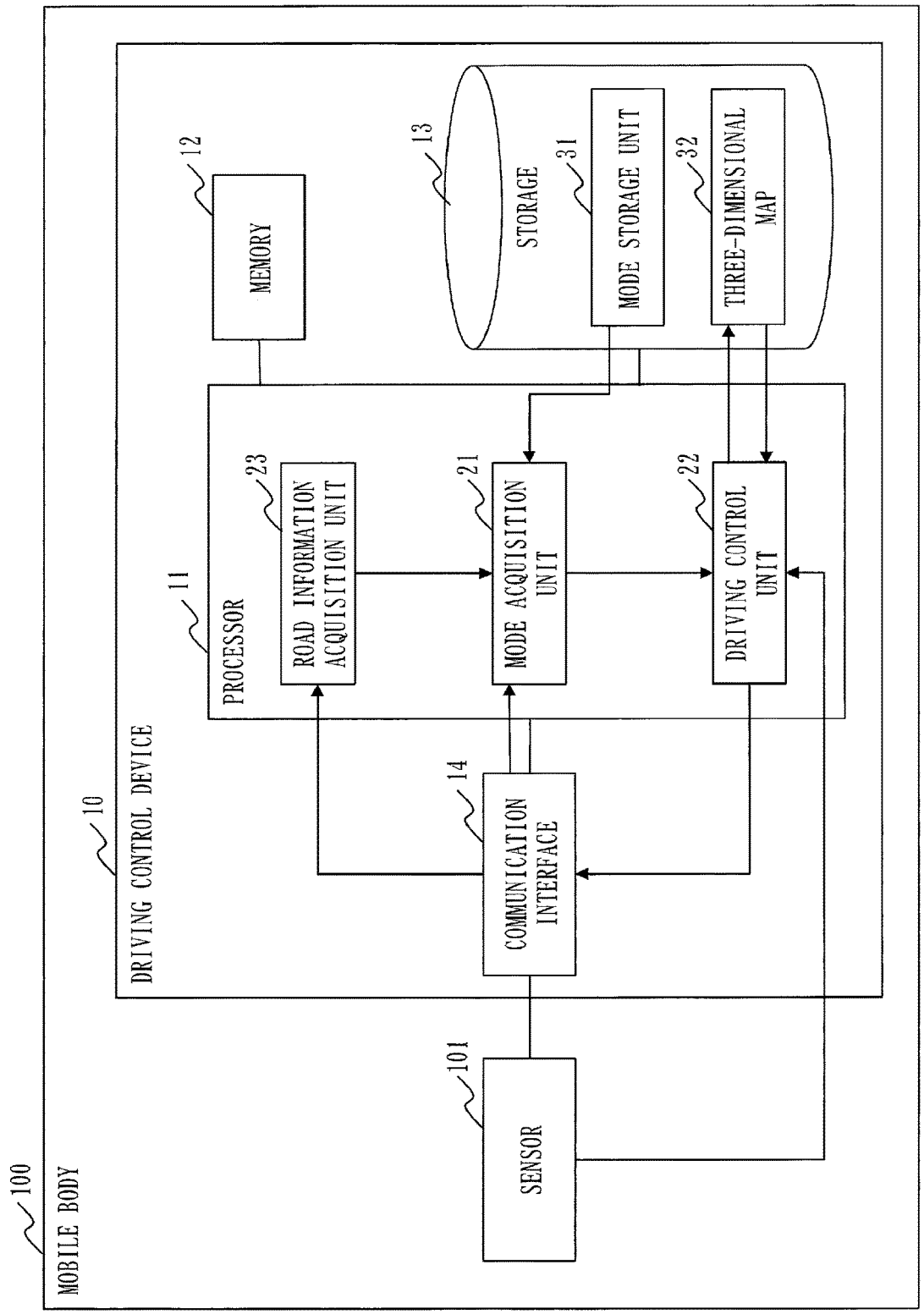
FIG. 6 is a configuration diagram of a driving control device 10 according to Modification 3.

In this case, as illustrated in FIG. 6, a driving control device 10 is provided with a road information acquisition unit 23 in addition to function-constituent elements illustrated in FIG. 1. The road information acquisition unit 23 is implemented by software or hardware, as the other function-constituent elements are.

An operation of the driving control device 10 according to Modification 3 will be described with referring to FIG. 7.

Figure 7:
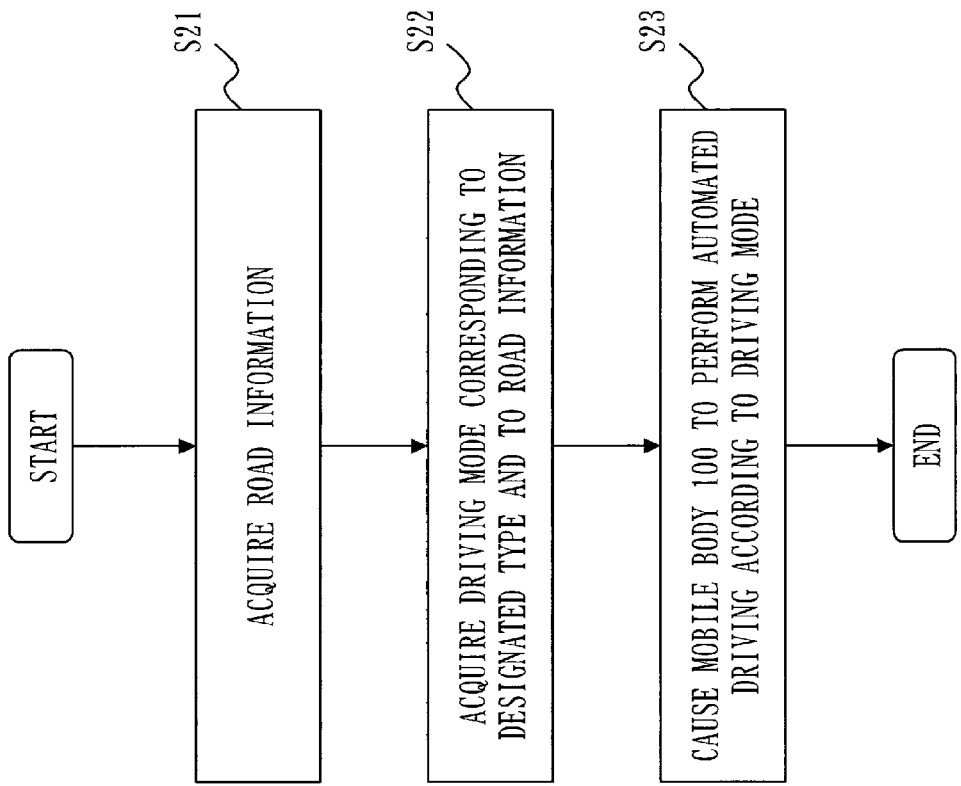
FIG. 7 is a flowchart illustrating an operation of the driving control device 10 according to Modification 3.

(Step S21 of FIG. 7: Road Information Acquisition Process)

The road information acquisition unit 23 transmits a planned moving route of a mobile body 100 to a road-side apparatus. Then, the road-side apparatus transmits road information of the planned moving route of the mobile body 100 to the driving control device 10. The road information acquisition unit 23 acquires the road information transmitted from the road-side apparatus. The road information acquisition unit 23 writes the acquired road information to a memory 12.

The road information acquisition unit 23 may acquire the road information from another device such as a server outside the mobile body 100, in place of from the road-side apparatus.

(Step S22 of FIG. 7: Mode Acquisition Process)

A mode acquisition unit 21 reads out the road information acquired in step S21 from the memory 12. The mode acquisition unit 21 acquires a driving mode corresponding to the designated type and to the readout road information, from a mode storage unit 31. The mode storage unit 31 stores the driving modes by driver type and by road information.

Step S23 of FIG. 7 is the same as step S12 of FIG. 2.

Embodiment 3

Manned driving by the driver is learned, and a learned data mode in which control that is close to manned driving can be selected as a driving mode. In this respect, Embodiment 3 is different from Embodiments 1 and 2. In Embodiment 3, this difference will be described, and description of a matter shared with Embodiments 1 and 2 will be omitted.

In Embodiment 3, a case will be described where a function is added to Embodiment 1. However, it is also possible to add a function to Embodiment 2.

* Description of Configuration *

A configuration of a driving control device 10 according to Embodiment 3 will be described with referring to FIG. 8.

The driving control device 10 is provided with a learning unit 24. In this respect, this driving control device 10 is different from the driving control device 10 illustrated in FIG. 1. A storage 13 implements a function of a learned data storage unit 33. In this respect, this driving control device 10 is different from the driving control device 10 illustrated in FIG. 1. The learning unit 24 is implemented by software or hardware, as the other function-constituent elements are.

* Description of Operation *

An operation of the driving control device 10 according to Embodiment 3 will be described with referring to FIG. 9.

The operation of the driving control device 10 according to Embodiment 3 corresponds to a driving control method according to Embodiment 3. The operation of the driving control device 10 according to Embodiment 3 also corresponds to a driving control program according to Embodiment 3.

Figure 9:
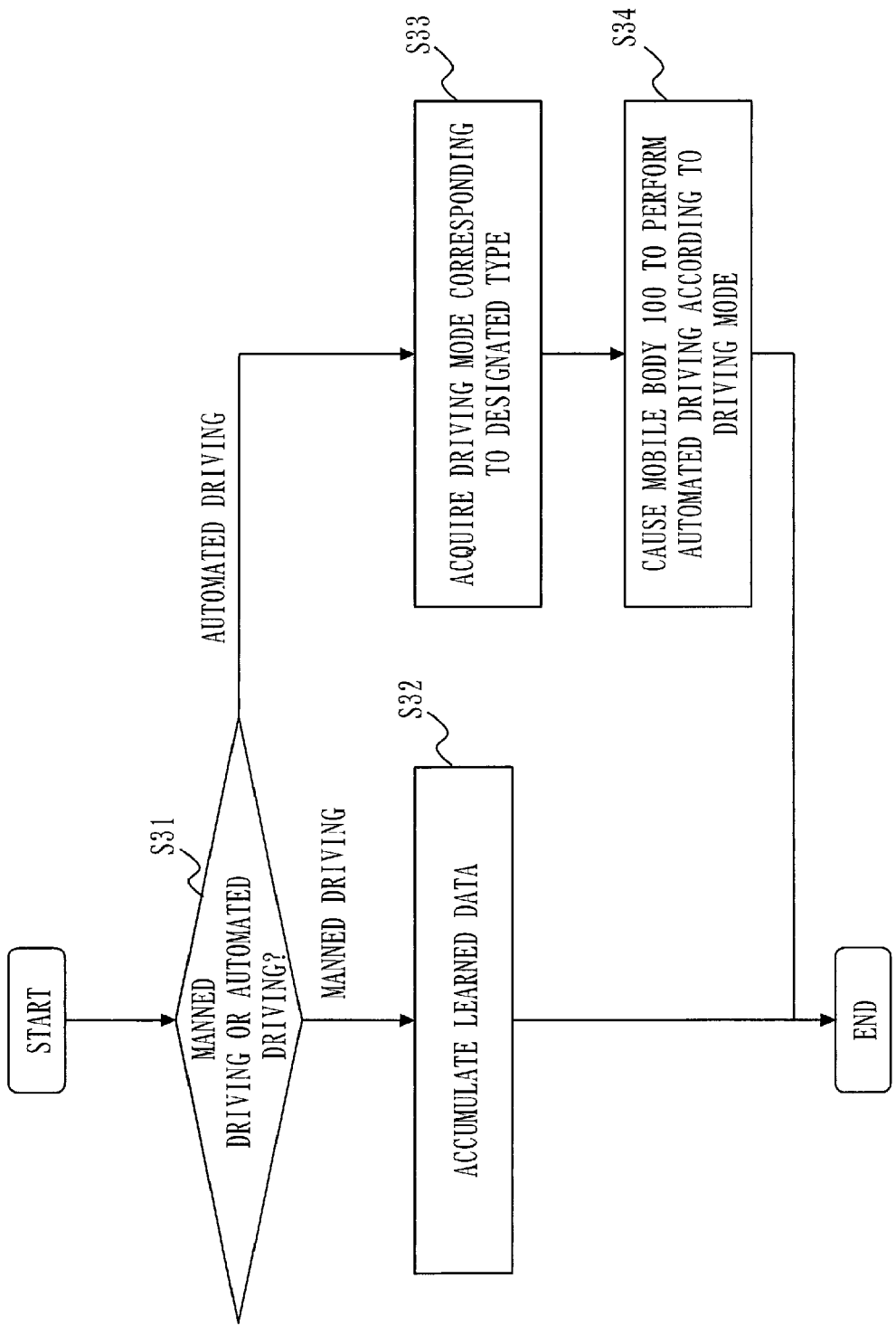
FIG. 9 is a flowchart illustrating an operation of the driving control device 10 according to Embodiment 3.

In Embodiment 3, processing illustrated in FIG. 9 is performed periodically, or each time movement is made for a criterion distance.

(Step S31 of FIG. 9: Control Determination Process)

The learning unit 24 determines whether a mobile body 100 is driven by manned driving of a driver, or by automated driving. Specifically, the driver selects either manned driving or automated driving. The learning unit 24 acquires selected information to determine which one is to be performed, manned driving or automated driving.

If manned driving is to be performed, the learning unit 24 advances processing to step S32. If automated driving is to be performed, the learning unit 24 advances processing to step S33.

(Step S32 of FIG. 9: Learning Process)

The learning unit 24 accumulates behavior of the mobile body 100 in manned driving, in the learned data storage unit 33 as learned data.

Specifically, the learning unit 24 acquires data such as a speed of the mobile body 100, acceleration in starting, timing to steer the steering wheel for a curve, and so on, as learned data. The learning unit 24 accumulates the acquired learned data to the learned data storage unit 33.

(Step S33 of FIG. 9: Mode Acquisition Process)

A mode acquisition unit 21 acquires a driving mode corresponding to a designated type which is a designated driver type among driver types provided by driving skill, just as in step S11 of FIG. 2.

Note that in Embodiment 3, there is a case where driver is designated as the driver type. When driver is designated as the driver type, the mode acquisition unit 21 acquires, as the driving mode, a learned data mode indicating a control method specified from the learned data accumulated in step S32.

(Step S34 of FIG. 9: Driving Control Process)

The driving control unit 22 causes the mobile body 100 to perform automated driving in accordance with the control method indicated by the driving mode acquired in step S33, just as in step S12 of FIG. 2.

When learned data mode is acquired in step S33, the driving control unit 22 causes the mobile body to perform automated driving in accordance with the control method specified from the learned data. Specifically, the driving control unit 22 reads out the learned data from the learned data storage unit 33. The driving control unit 22 controls the mobile body 100 according to the speed, acceleration in starting, timing to steer the steering wheel, and so on which are indicated by the readout learned data.

* Effect of Embodiment 3 *

As described above, in the driving control device 10 according to Embodiment 3, behavior of the mobile body 100 in manned driving is accumulated as learned data, and is reflected in automated driving. Hence, automated driving that is close to manned driving by a driver can be realized. Therefore, the odd feeling and scare the driver and the passenger may have due to automated driving can be reduced.

* Other Configuration *

<Modification 4>

In Embodiment 3, the behavior of the mobile body 100 in manned driving is simply treated as learned data. However, behavior of a mobile body 100 for each road information such as a straight road, a moderate curve, and a sharp curve can be treated as learned data. Then, automated driving that is close to manned driving by a driver can be realized.

Figure 8:
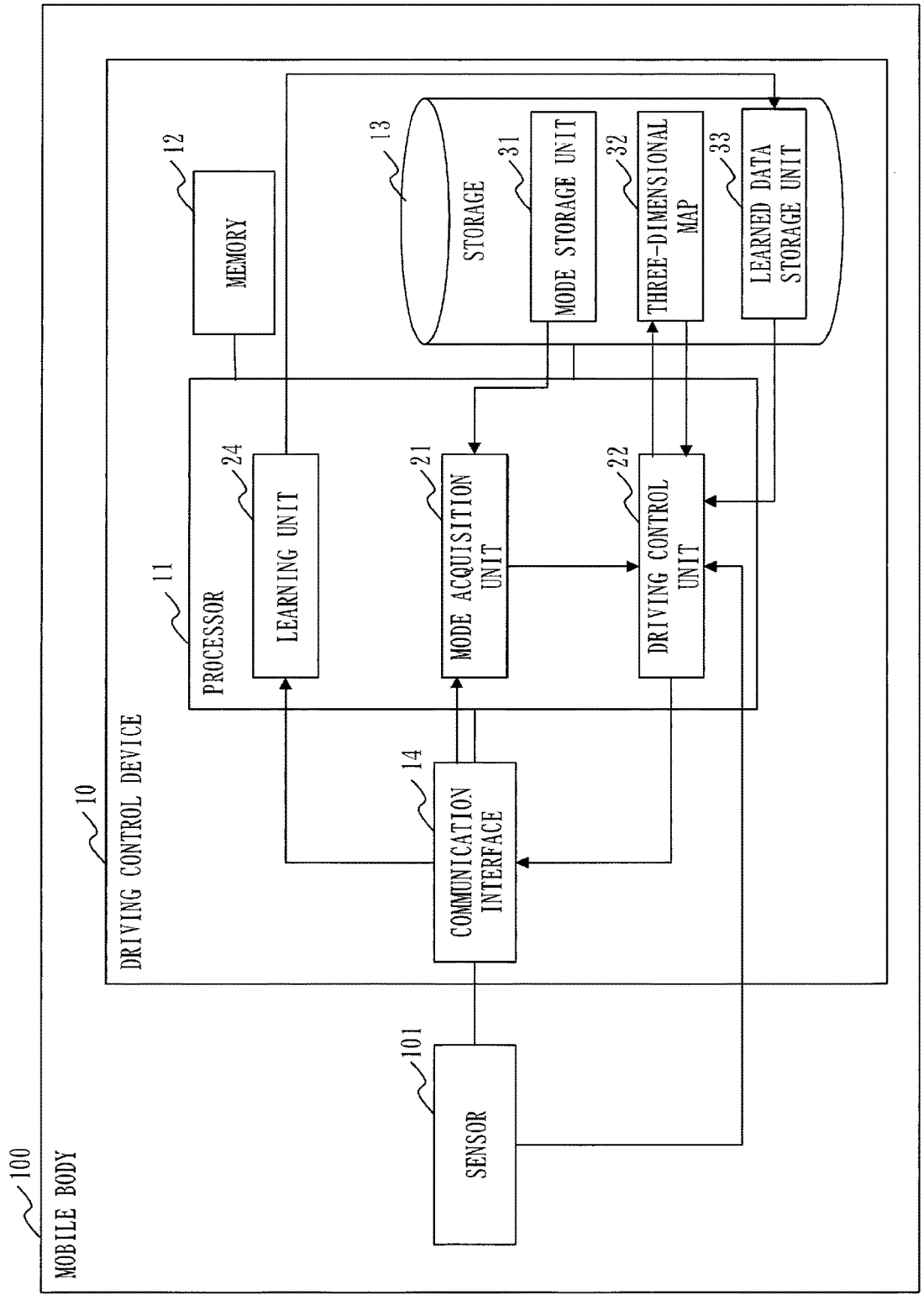
FIG. 8 is a configuration diagram of a driving control device 10 according to Embodiment 3.
Figure 10:
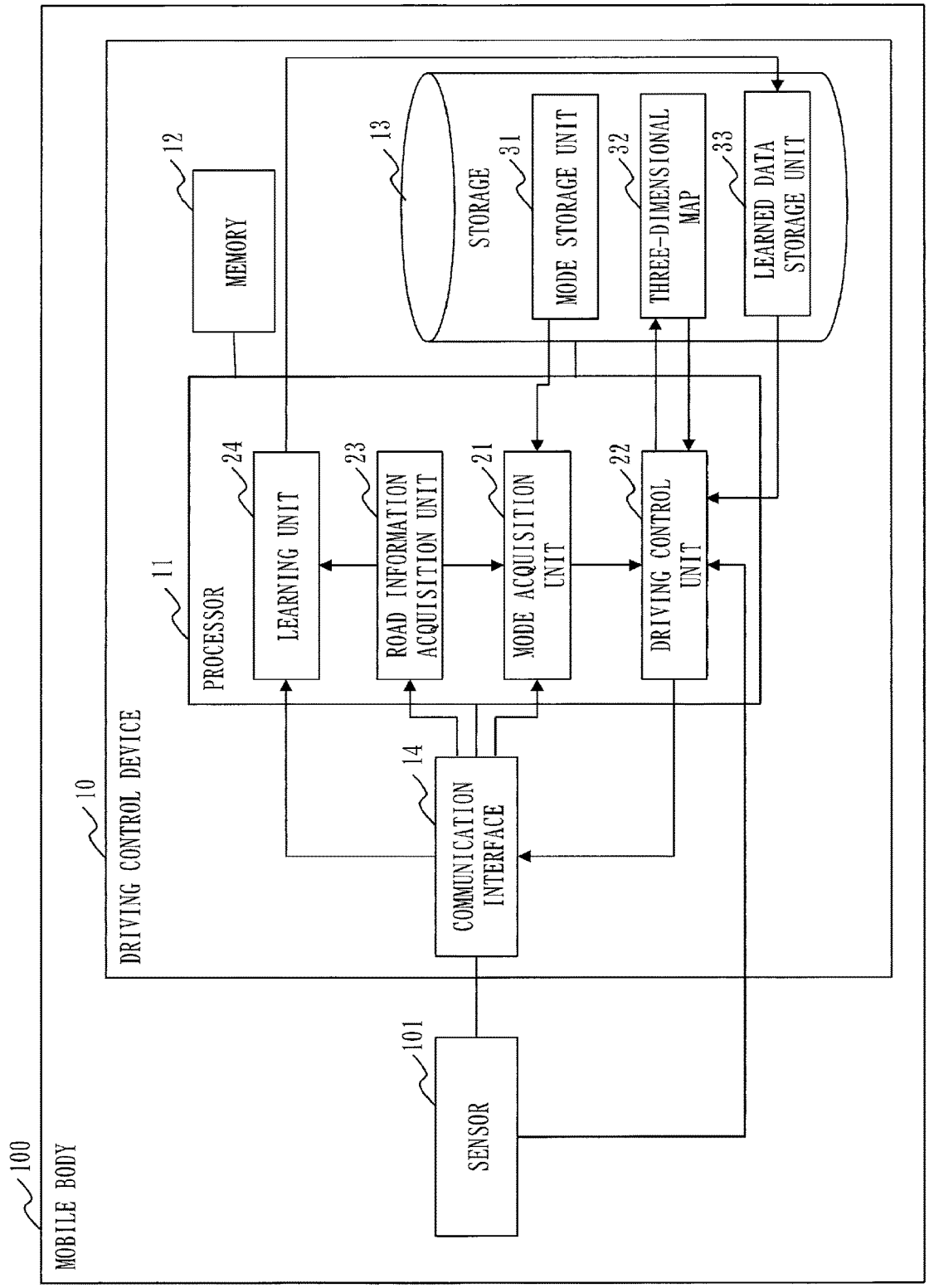
FIG. 10 is a configuration diagram of a driving control device 10 according to Modification 4.

In this case, as illustrated in FIG. 10, a driving control device 10 is provided with a road information acquisition unit 23 in addition to function-constituent elements illustrated in FIG. 8. The road information acquisition unit 23 is implemented by software or hardware, just as the other function-constituent elements are.

An operation of the driving control device 10 according to Modification 4 will be described with referring to FIG. 9.

Processes of step S31 and step S33 of FIG. 9 are the same as those of Embodiment 3.

(Step S32 of FIG. 9: Learning Process)

A learning unit 24 accumulates behavior of the mobile body 100 in manned driving, in a learned data storage unit 33 as learned data.

On this occasion, the road information acquisition unit 23 transmits a planned moving route of the mobile body 100 to a road-side apparatus. Then, the road-side apparatus transmits road information of the planned moving route of the mobile body 100 to the driving control device 10. The road information acquisition unit 23 acquires the road information transmitted from the road-side apparatus. The learning unit 24 accumulates, in the learned data storage unit 33, the learned data obtained in movement along the moving route, as well as the road information of the moving route which is acquired by the road information acquisition unit 23.

(Step S34 of FIG. 9: Driving Control Process)

The driving control unit 22 causes the mobile body 100 to perform automated driving in accordance with a control method indicated by the driving mode acquired in step S33.

When the learned data mode is acquired in step S33, the road information acquisition unit 23 acquires the road information of the planned moving route of the mobile body 100, just as in step S32. The driving control unit 22 causes the mobile body 100 to perform automated driving in accordance with the control method specified from the learned data corresponding to the road information acquired by the road information acquisition unit 23, among the learned data accumulated in the learned data storage unit 33. For example, if the road information indicates that the moving route is straight, the driving control unit 22 causes the mobile body 100 to perform automated driving according to the learned data containing the fact that the moving route is straight, together with the road information. If the road information indicates that the moving route forms a moderate curve, the driving control unit 22 causes the mobile body 100 to perform automated driving according to the learned data containing the fact that the moving route forms a moderate curve, together with the road information.

REFERENCE SIGNS LIST

10: driving control device; 11: processor; 12: memory; 13: storage; 14: communication interface; 15: electronic circuit; 21: mode acquisition unit; 22: driving control unit; 23: road information acquisition unit; 24: learning unit; 31: mode storage unit; 100: mobile body.

The invention claimed is:

1. A driving control device comprising:
   processing circuitry configured to:
      acquire a driving mode corresponding to road information of a planned moving route of a mobile body and a designated type which is a designated driver type among driver types provided by driving skill,
      wherein the driving skill is based on at least one of a speed of the mobile body compared to a speed limit, speed control of the mobile body while turning a curve, and steering wheel control of the mobile body while turning the curve, and
      wherein the road information includes at least one of (i) a road surface status indicating whether the road surface is dry, wet, or frozen, (ii) weather status indicating whether the weather is clear, rainy, or foggy, and (iii) a road status indicating whether the road is straight, forms a moderate curve, or forms a sharp curve; and
      refer to map data stored in a storage device and added with travel-controlling position information corresponding to a driver type, and cause the mobile body to perform automated driving in accordance with a correspondence relationship between the travel-controlling position information corresponding to the driver type of the acquired driving mode and a position of the mobile body which is obtained by a position location device,
      wherein the travel-controlling position information includes first position coordinate data, by the driver type, indicating a position of a point to slow down the speed of the mobile body before a curve, and second position coordinate data, by the driver type, of travel trajectory along the curve,
      wherein the position of the point to slow down the speed of the mobile body before the curve is a first position that is a first distance before the curve for a first driver type having a high driving skill, the position of the point to slow down the speed of the mobile body before the curve is a second position that is a second distance, greater than the first distance, before the curve for a second driver type having an intermediate driving skill, and the position of the point to slow down the speed of the mobile body before the curve is a third position that is a third distance, greater than the second distance, before the curve for a third driver type having a low driving skill,
      wherein the first position coordinate data and the second position coordinate data of the travel-controlling position information are set based on three-dimensional coordinates of static information of a dynamic map, and
      wherein the mobile body is configured to perform automated driving based on a speed limit at the first position coordinate data and the driver type such that the mobile body with the first and second driver types is caused to travel at the speed limit, and the mobile body with the third driver type is caused to travel at a speed that is less than the speed limit.

2. The driving control device according to claim 1, wherein the processing circuitry is further configured to:
   transmit the designated type to a road-side apparatus,
   acquire the driving mode corresponding to the designated type and to the road information of the planned moving route of the mobile body from the road-side apparatus, and
   cause the mobile body to perform automated driving in accordance with a control method indicated by the driving mode.

3. The driving control device according to claim 1, wherein the processing circuitry is further configured to:
   accumulate behavior of the mobile body while being driven by a driver as learned data,
   when the driver is designated as the driver type, acquire, as the driving mode, a learned data mode indicating a control method specified from the accumulated learned data, and
   when the learned data mode is acquired, cause the mobile body to perform automated driving in accordance with the control method specified from the learned data.

4. The driving control device according to claim 3, wherein the processing circuitry is further configured to:
   accumulate the learned data obtained in movement along the moving route, as well as the road information of the moving route, and
   when the learned data mode is acquired, cause the mobile body to perform automated driving in accordance with a control method specified from learned data corresponding to the acquired road information, among the accumulated learned data.

5. The driving control device according to claim 1, wherein the first, second, and third positions are further based on a degree of a bend of the curve from a straight line of the road and a width of the road.

6. The driving control device according to claim 5, wherein the first position is at a first outward distance from a center line of the road, the second position is at a second outward distance, less than the first outward distance, from the center line of the road, and the third position is at a third outward distance, less than the second outward distance, from the center line of the road.

7. A driving control method comprising:
   acquiring a driving mode corresponding to road information of a planned moving route of a mobile body and a designated type which is a designated driver type among driver types provided by driving skill,
   wherein the driving skill is based on at least one of a speed of the mobile body compared to a speed limit, speed control of the mobile body while turning a curve, and steering wheel control of the mobile body while turning the curve, and
   wherein the road information includes at least one of (i) a road surface status indicating whether the road surface is dry, wet, or frozen, (ii) weather status indicating whether the weather is clear, rainy, or foggy, and (iii) a road status indicating whether the road is straight, forms a moderate curve, or forms a sharp curve; and
   referring to map data stored in a storage device and added with travel-controlling position information corresponding to a driver type, and causing a mobile body to perform automated driving in accordance with a correspondence relationship between the travel-controlling position information corresponding to the driver type of the acquired driving mode and a position of the mobile body which is obtained by a position location device, wherein the travel-controlling position information includes first position coordinate data, by the driver type, indicating a position of a point to slow down the speed of the mobile body before a curve, and second position coordinate data, by the driver type, of travel trajectory along the curve, wherein the position of the point to slow down the speed of the mobile body before the curve is a first position that is a first distance before the curve for a first driver type having a high driving skill, the position of the point to slow down the speed of the mobile body before the curve is a second position that is a second distance, greater than the first distance, before the curve for a second driver type having an intermediate driving skill, and the position of the point to slow down the speed of the mobile body before the curve is a third position that is a third distance, greater than the second distance, before the curve for a third driver type having a low driving skill, wherein the first position coordinate data and the second position coordinate data of the travel-controlling position information are set based on three-dimensional coordinates of static information of a dynamic map, and wherein the mobile body is configured to perform automated driving based on a speed limit at the first position coordinate data and the driver type such that the mobile body with the first and second driver types is caused to travel at the speed limit, and the mobile body with the third driver type is caused to travel at a speed that is less than the speed limit.

8. A non-transitory computer readable medium storing a driving control program which causes a computer to execute:

a mode acquisition process of acquiring a driving mode corresponding to road information of a planned moving route of a mobile body and a designated type which is a designated driver type among driver types provided by driving skill, wherein the driving skill is based on at least one of a speed of the mobile body compared to a speed limit, speed control of the mobile body while turning a curve, and steering wheel control of the mobile body while turning the curve, and wherein the road information includes at least one of (i) a road surface status indicating whether the road surface is dry, wet, or frozen, (ii) weather status indicating whether the weather is clear, rainy, or foggy, and (iii) a road status indicating whether the road is straight, forms a moderate curve, or forms a sharp curve; and a driving control process of referring to map data stored in a storage device and added with travel-controlling position information corresponding to a driver type, and causing a mobile body to perform automated driving in accordance with a correspondence relationship between the travel-controlling position information corresponding to the driver type of the driving mode acquired by the mode acquisition process and a position of the mobile body which is obtained by a position location device, wherein the travel-controlling position information includes first position coordinate data, by the driver type, indicating a position of a point to slow down the speed of the mobile body before a curve, and second position coordinate data, by the driver type, of travel trajectory along the curve, wherein the position of the point to slow down the speed of the mobile body before the curve is a first position that is a first distance before the curve for a first driver type having a high driving skill, the position of the point to slow down the speed of the mobile body before the curve is a second position that is a second distance, greater than the first distance, before the curve for a second driver type having an intermediate driving skill, and the position of the point to slow down the speed of the mobile body before the curve is a third position that is a third distance, greater than the second distance, before the curve for a third driver type having a low driving skill, wherein the first position coordinate data and the second position coordinate data of the travel-controlling position information are set based on three-dimensional coordinates of static information of a dynamic map, and wherein the mobile body is configured to perform automated driving based on a speed limit at the first position coordinate data and the driver type such that the mobile body with the first and second driver types is caused to travel at the speed limit, and the mobile body with the third driver type is caused to travel at a speed that is less than the speed limit.

\* \* \* \* \*